United States Patent [19]

McManigal

[11] Patent Number: 5,040,714

[45] Date of Patent: Aug. 20, 1991

[54] BORE FORMING SEALED COUPLING AND PROCESS

[75] Inventor: Paul G. McManigal, Newport Beach, Calif.

[73] Assignee: Vemco Corporation, San Dimas, Calif.

[21] Appl. No.: 512,341

[22] Filed: Apr. 23, 1990

[51] Int. Cl.⁵ .......................... E21B 33/00; F16J 9/00
[52] U.S. Cl. ...................................... 277/1; 277/167.5; 277/236; 285/910; 285/80; 285/139; 285/382; 285/917; 29/237
[58] Field of Search .................. 285/80, 139, 382, 910, 285/917, 390, 328, 329, 330, 353, 384; 277/1, 167.5, 169, 236; 29/237, 890.14

[56] References Cited

U.S. PATENT DOCUMENTS

| | | | |
|---|---|---|---|
| 748,546 | 12/1903 | Vail | 285/353 X |
| 1,138,946 | 5/1915 | Elliott | 285/910 X |
| 1,834,581 | 12/1931 | Ferrell et al. | 285/328 |
| 1,836,198 | 12/1931 | Spyer | 285/328 |
| 2,805,872 | 9/1957 | Routh | 285/910 X |
| 3,109,671 | 11/1963 | Braun | 285/330 X |
| 3,208,758 | 9/1965 | Carlson et al. | 277/167.5 |
| 4,303,251 | 12/1981 | Harra et al. | 277/167.5 X |
| 4,552,389 | 11/1985 | Babuder et al. | 285/910 X |
| 4,650,227 | 3/1987 | Babuder et al. | 285/379 |
| 4,665,960 | 5/1987 | Brzezicki et al. | 141/384 |
| 4,854,597 | 8/1989 | Leigh | 277/1 |

FOREIGN PATENT DOCUMENTS

| | | | |
|---|---|---|---|
| 581937 | 8/1959 | Canada | 285/910 |
| 3105395 | 11/1982 | Fed. Rep. of Germany | 285/917 |
| 588781 | 6/1947 | United Kingdom | 285/328 |

Primary Examiner—William A. Cuchlinski, Jr.
Assistant Examiner—James K. Folker
Attorney, Agent, or Firm—William W. Haefliger

[57] ABSTRACT

Opposed ends of two tubular members are relatively displaced toward opposite sides of an annular seal to deform the seal and reduce the seal bore into approximate or actual alignment with the tubular members bore.

13 Claims, 3 Drawing Sheets

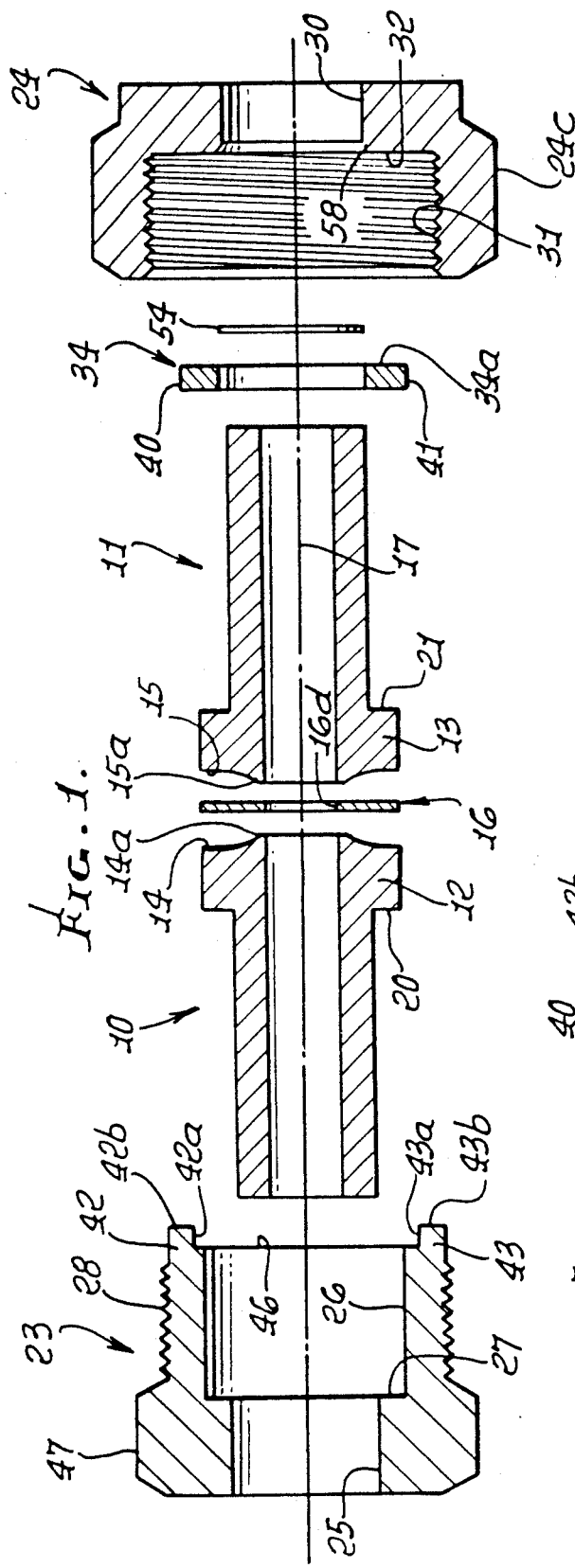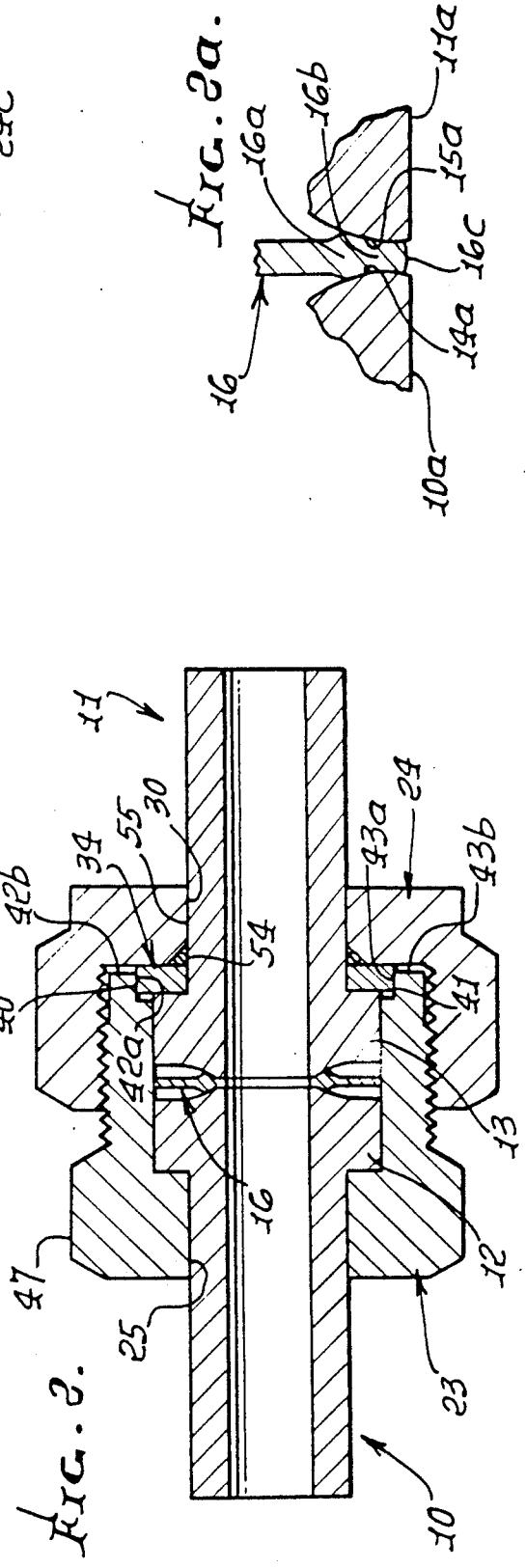

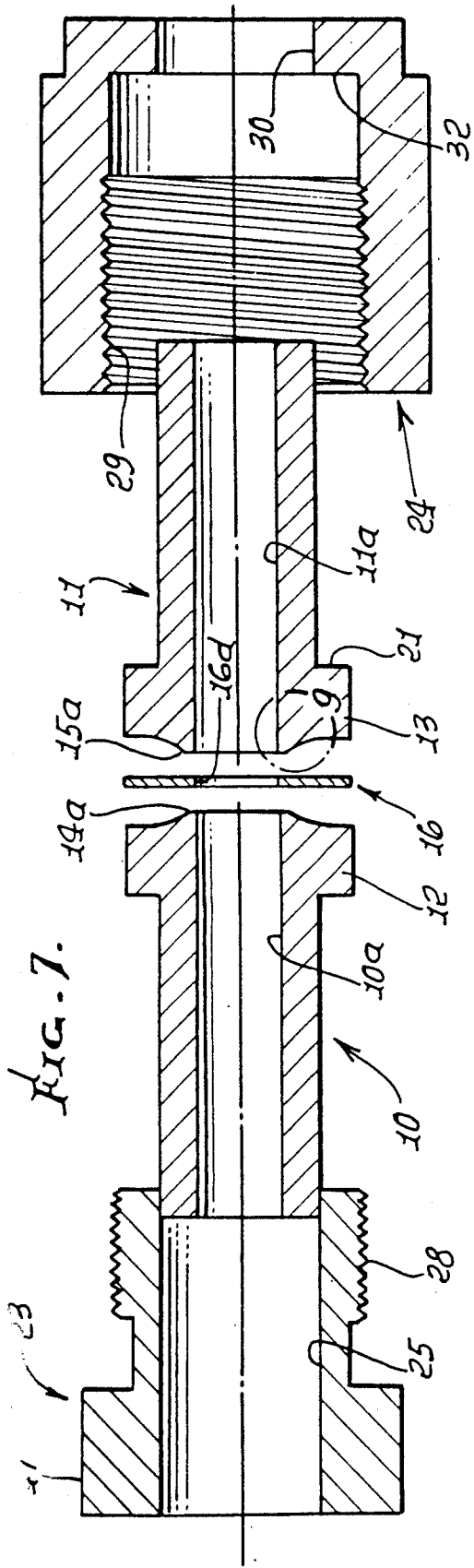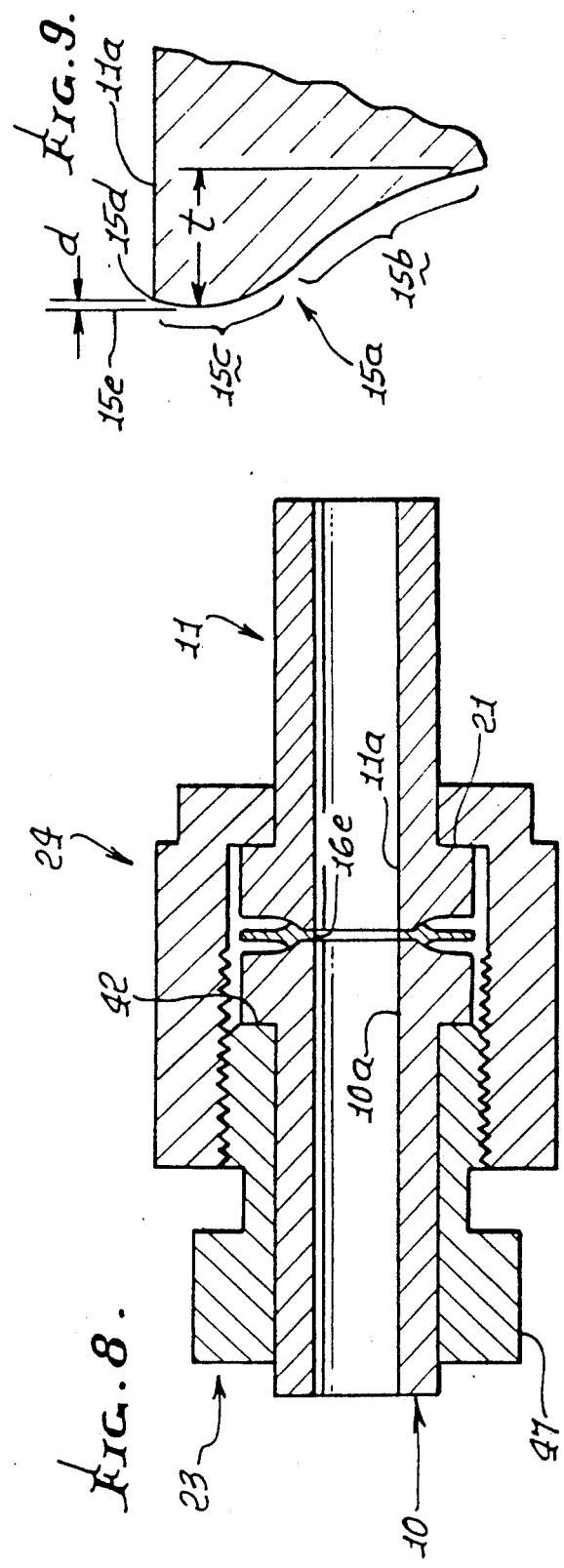

BORE FORMING SEALED COUPLING AND PROCESS

BACKGROUND OF THE INVENTION

This invention relates generally to fittings or couplings, and more particularly to improvements in effecting seals between the opposed ends of tubular parts or members, with minimum void area for trapping contaminates next to the through bore of the fitting or coupling.

When tightening tubular parts extending generally coaxially, a seal is typically placed between the tubular parts. Then, when tightening the tube fitting union nuts, the tubular parts load and energize the seal. On some fitting or coupling designs, there is a void space formed between the opposed ends of the tubular parts, radially inwardly of the seal, that tends to trap foreign material. This type of design becomes incompatible with the desired smooth bore to be formed by the fittings. Bore interruptions at the seal location can trap fluid which then leads to later contamination of fluid passed through the fitting.

There is need for an improved fitting or coupling assembly not subject to such problems and disadvantages.

SUMMARY OF THE INVENTION

It is a major object of the invention to provide a fitting or coupling assembly that will meet the above needs. As will appear, the provided coupling is characterized as interconnecting two tubular parts between which a seal is held or compressed by protrusions on the opposed ends of the tubular parts. The opposed ends are displaced toward one another to cause the protrusions to penetrate and deform the seal and reduce its bore into approximate flush relation with the tubular part bores, thus eliminating any appreciable fluid entrapment space.

As will be seen, the two protrusions are desirably alike in shape, and penetrate the seal to substantially reduce the seal thickness, axially, at the closest separation of the protrusions. The tubular parts and seal are typically metallic.

It is another object of the invention to provide two annular protrusions as referred to, each such protrusion having a first portion that is concave in axial radial planes, a second portion that is convex in axial radial planes, and the second portion intersecting the seal bore at a locus which is at an axial distance "d" from a plane tangent to a nose formed by said convex portion, the distance "d" being substantially less than the axial overall dimension of the protrusion.

Another object is to provide such smooth bore forming elements in combination with coupling members having shoulders respectively engaging shoulders carried on the tubular parts, to transmit force to the tubular parts for displacing them as referred to. As will be seen, one of the shoulders carried on one of the tubular parts may be defined by a torque isolator washer received on the one tubular part and blocked against rotation relative to the coupling member which engages the other of the tubular parts.

Yet another object is to provide a method of sealing off between the opposed annular ends of tubular parts, the coupling member having bores, the steps that include:

a) locating the ends in spaced apart relation, with the tubular parts extending coaxially,
b) providing an annular seal between the opposed ends, the seal having a bore that is larger than the tubular part bores,
c) relatively displacing the tubular parts to cause the annular ends thereof to engage opposite sides of the annular seal,
d) and controllably further relatively displacing the tubular parts to cause the annular ends thereof to compressively deform the seal and to reduce the seal bore into approximate flush relation with the tubular part bores.

These and other objects and advantages of the invention, as well as the details of an illustrative embodiment will be more fully understood from the following specification and drawings, in which:

DRAWING DESCRIPTION

FIG. 1 is a section taken in elevation through coupling elements in exploded condition prior to make-up;

FIG. 2 is a section like FIG. 1 showing the FIG. 1 coupling in made-up condition;

FIG. 2a is an enlarged fragmentary section showing seal deformation;

FIG. 7 is a section like FIG. 1 showing a modification;

FIG. 8 is a view like FIG. 2 showing the modification of FIG. 7 in made-up condition; and FIG. 9 is an enlarged fragmentary view of a protrusion profile taken on lines 9—9 of FIG. 7.

DETAILED DESCRIPTION

Figure 3:
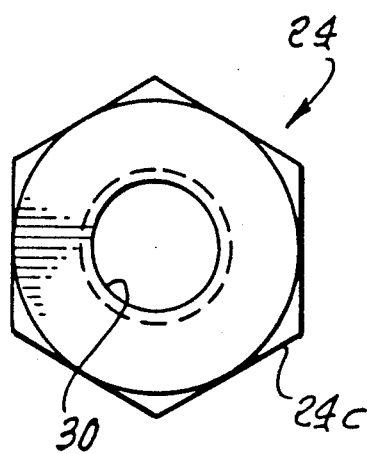
FIG. 3 is an end view of a female coupling taken on lines 3—3 of FIG. 1.

In FIGS. 1 and 2, two tubular parts 10 and 11 extend coaxially and have opposed ends. Flanges 12 and 13 on those parts define such ends at 14 and 15, and the flanges include annular protrusions 14a and 15a (each half toroidal) that present convex surfaces engageable with opposite flat sides of a metallic annular seal or compression washer 16. Coupling structure is provided to urge the ends 14 and 15 toward one another so that protrusions 14a and 15a may tightly engage and seal against the annular seal 16 without rotary twisting movement about axis 17.

For this purpose, the tubular parts are provided with shoulders 20 and 21 facing axially oppositely away from the seal. Force is applicable against those shoulders to urge the parts 10 and 11 toward one another, without relative twisting. To this end, two tubular members are provided to define or extend coaxially with axis 17. See in this regard male member 23, and female member 24, adapted to coaxially receive the respective tubular parts 10 and 11, and to transmit axial force thereto, via the shoulders 20 and 21, when the members are made up. In this regard, member 23 has a bore 25 to receive tubular part 10, a counterbore 26 to receive flange 12, and a step shoulder 27 engageable with shoulder 20 on tubular part 10, to urge that tubular part rightwardly. Member 23 also has an external screw thread at 28 for threaded interengagement with interior "box" thread at 29 on female member 24, as is clear from FIG. 2. Member 24 has a bore 30 closely receiving the outer surface of part 11, a thread tip defined "bore" 31 to receive the forwardmost structure 42 and 43 of the member 23, and a shoulder 32 facing axially leftwardly to act as a pusher surface.

Figure 4:
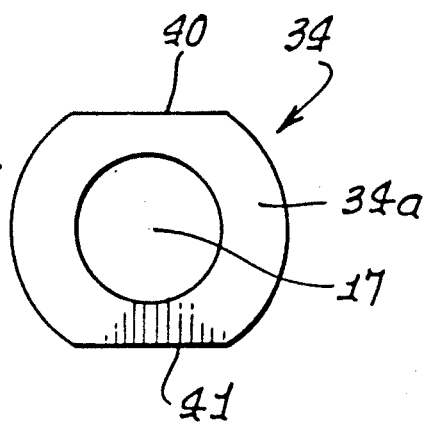
FIG. 4 is an end view of a torsion isolator, as employed in FIGS. 1 and 2.
Figure 5:
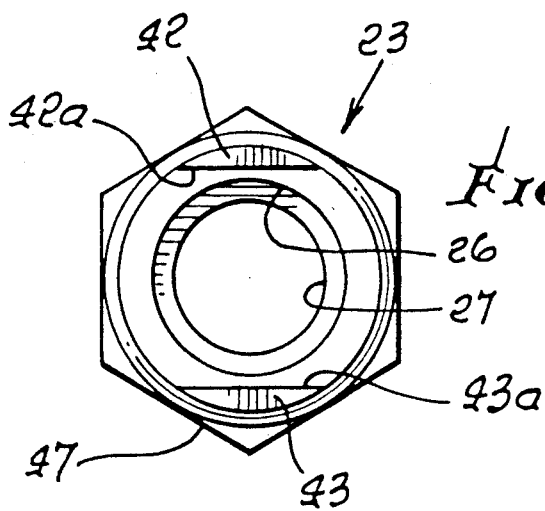
FIG. 5 is an end view of a male coupling member, as employed in FIGS. 1 and 2.
Figure 6:
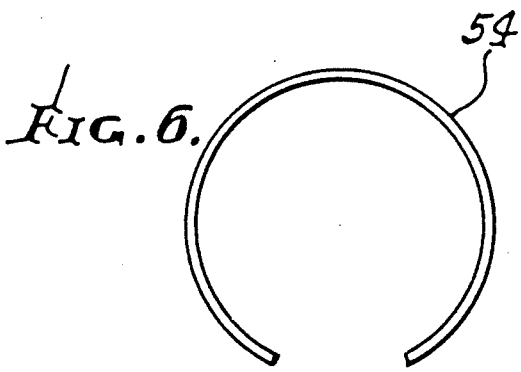
FIG. 6 is an axial view of a lock element as employed in FIGS. 1 and 2.

A torque isolator washer 34 bears against shoulder 21 on tubular part 11, and generally longitudinally projecting means 42 and 43 is positioned or carried on the male member 23 to block rotation of the isolator washer 34 relative to that member 23, and about axis 17. As seen in FIG. 4, the washer 34 has peripheral flat means engaged by the projection means to effect the blocking of rotation of the washer 34 relative to male member 23. As shown, two parallel flats 40 and 41 are provided at the rim of the washer 34, at opposite sides of the axis 17; and the projection means preferably comprises two longitudinal projections 42 and 43 integral with 23, and spaced outwardly relative to counterbore 26 inasmuch as the flats 40 and 41 are also spaced outwardly of the counterbore 26 that also closely receives the two flanges 12 and 13. The projections 42 and 43 have flats 42a and 43a located close to, i.e, overlapping, the flats 40 and 41, respectively, to be engageable therewith and block rotation of the washer 34, as seen in FIG. 2. That washer 34 has plate shape, as seen in the drawings Flats 42a and 43a face radially inwardly. The end of the male member 23 from which the projections 42 and 43 extend is indicated at 46. See also co-pending U.S. Pat. Application Ser. No. 493,423 to Miller.

Upon make-up of the coupling, the nut member 24 is rotatably threaded onto member 23, while the latter is held against rotation, as by a wrench gripping external flats 47 on 23. Flats 24c on 24 may also be gripped by a wrench. Such rotation of member 24 brings step shoulder 32 (i.e., pusher surface) into forcible engagement with the right face 34a of the torsion isolating washer 34, as seen in FIG. 2. Make-up force is thus transmitted via 34 and shoulder 21 to part 11 for effecting squeezing of the annular seal 16. Washer 34 acts to isolate the frictional torsion exerted by the rotating step shoulder 32, and prevent torque transmission to the surface 21, since the projections 42 and 43 block rotation of the washer 34 by virtue of the interengageable flats on the projection and isolator annulus. Accordingly, tubular parts 10, 11, member 23, and washer 34 all may be considered as non-rotating, relative to member 24 as the latter is rotatably tightened onto member 23.

A C-shaped interior clip or ring (spring ring) 54 is also preferably provided to grip part 11 at the outer surface 55 of that part, as shown, for positioning the annulus 34 on the part 11, adjacent flange 13. The nut member 24 has an annular recess 58 intersecting bore 30 and step shoulder 32 to receive the spring ring upon make-up. The clip or ring 54 also initially prevents rotation of the washer 34 to keep the flats 40 and 41 on the washer 34 axially aligned with the flats 42a and 43a on the projections 42 and 43 during make-up.

Note that the terminal ends 42a and 43b of the projections 42 and 43 remain spaced from the step shoulder 32 during make-up. Accordingly, the washer 34 is sufficiently thick to serve a spacing function, keeping the ends 42b and 43b spaced from 32.

The elements may consist of the following materials:
10 316 stainless steel
11 316 stainless steel
23 316 stainless steel
24 316 stainless steel
16 nickel
34 316 stainless steel
54 316 stainless steel In accordance with the invention herein, the annular protrusions 14a and 15a are shaped so as to compressively deform the annular seal 16, as better seen in FIG. 2a. Note that the protrusions 14a and 15a penetrate opposite sides of the annular seal 16 to cause axial expansion or thickening at annular seal region 16a, axial thinning or reduction at annular seal region 16b, and some lesser thinning or reduction at annular seal region 16c. Thus, the seal becomes radially locked in position during make-up. Note that initially the annular seal bore diameter at 16d in FIG. 1 is greater than the bore diameters 10a and 11a of the tubular parts 10 and 11. The resultant bore diameter of the annular seal 16, after deformation, is substantially flush with the bore diameters 10a and 11a of the tubular parts 10 and 11. This minimizes the possibility of void formation to trap associated fluids, such as gases, which might reduce the ultra clean (i.e., uncontaminated) conditions desired in certain fluid flow applications.

In FIGS. 7 and 8, the elements corresponding to those in FIGS. 1 and 2 bear the same numerals. The washer 34 is omitted, as are elements 42, 43 and 54. The elements referred to above in association with FIG. 2a are present, however, and the annular seal 16 is penetrated by the protrusions 14a and 15a to an extent to again produce a flushness with the tubular part bores 10a and 11a with the bore of the deformed seal, seen at 163.

FIG. 9 shows that the protrusion, as at 15a, has concavity at 15b, convexity at 15c, and intersects the bore 11a at a rim 15d, which is spaced axially small distance "d" from the plane 15e of the convex nose of the protrusion. These dimensional relationships assure that the bore diameter of the deformed seal will be brought into approximately flush relation with the bores 10a and 11a. The opposite protrusion 14a is the same as 15a, but mirror imaged relative thereto. The distance "d" is substantially less than the overall axial dimension "5" of the protrusion; "d" is typically less than 1/5 "t".

I claim:

1. In the method of sealing off between the opposed annular ends of two tubular parts, said parts having bores, the steps that include:
   a) locating said ends in spaced apart relation, with said tubular parts extending coaxially,
   b) providing an annular seal between said opposed ends, said seal having a bore that is larger than the tubular part bores,
   c) relatively displacing said tubular parts to cause said annular ends thereof to engage opposite sides of the annular seal,
   d) and controllably further relatively displacing said tubular parts to cause said annular ends thereof to compressively deform said seal to reduce the seal bore into approximate flush relation with the tubular part bores.

2. The method of claim 1 wherein said opposed annular ends form protrusions extending axially oppositely toward the seal, and said step d) includes causing said protrusions to compressively penetrate said seal.

3. The method of claim 1 wherein said tubular parts and seal ar metallic.

4. The method of claim 2 including providing tubular relatively rotatable coupling members having shoulders respectively engageable with shoulders carried on said tubular parts, and including progressively rotatably interconnecting said coupling members to transmit force to said tubular parts for displacing the tubular parts as per c) and d) of claim 1.

5. The method of claim 4 including providing a torque isolator washer on one of said tubular parts in spaced relation to said protrusion to transmit said axial force and including blocking rotation of said washer relative to the coupling member engaging the other tubular part during relative rotation of said coupling members.

6. The method of claim 2 including locating said protrusions to effect a reduction in the thickness of the annular seal at its bore when that bore is brought into said flush relation with the tubular part bores.

7. In apparatus for sealing off between the opposed annular ends of two tubular parts, said parts having bores, said apparatus comprising:
  a) said parts having end protrusions which extend at said ends annularly and convexly toward one another,
  b) there being an annular seal between said protrusions, said seal having a bore,
  c) said parts being relatively displaced toward one another so that said protrusions compressively deform the seal to reduce the seal bore into approximate flush relation with the part bores,
  d) said protrusions defining a gap therebetween, said gap having a substantially minimum dimension at the bores defined by said parts.

8. The combination of claim 7 wherein said protrusions are alike in shape, and penetrate the seal to substantially reduce the seal thickness, axially, at the closest separation of the protrusions.

9. The combination of claim 7 wherein said tubular parts and seal are metallic.

10. The combination of claim 7 wherein said tubular parts consist of steel, and said seal consists of nickel or nickel alloy.

11. The combination of claim 7 including interfitting coupling members having shoulders respectively engaging shoulders carried on said tubular parts to transmit force to said tubular parts for displacing them as per c) of claim 7.

12. The combination of claim 11 wherein one of said shoulders carried on one of said tubular parts is defined by a torque isolator washer received on said one tubular part and blocked against rotation relative to the mating coupling member which engages the other of said tubular parts.

13. In apparatus for sealing off between the opposed annular ends of two tubular parts, said parts having bores, said apparatus comprising:
  a) said parts having end protrusions which extend at said ends annularly and convexly toward one another,
  b) there being an annular seal between said protrusions, said seal having a bore,
  c) said parts being relatively displaced toward one another so that said protrusions compressively deform the seal to reduce the seal bore into approximate flush relation with the part bores,
  d) each annular protrusion having a first portion that is concave in axial radial planes, a second portion that is convex in axial radial planes, and said second portion intersecting a part bore at a locus which is at an axial distance "d" from a plane tangent to a nose formed by said convex portion, said distance "d" being substantially less than the axial overall dimension of said protrusion.

* * * * *